United States Patent [19]
Reeves

[11] 3,744,225
[45] July 10, 1973

[54] NUT HARVESTING MACHINE
[76] Inventor: Sam B. Reeves, 2323 Cherry St., Montgomery, Ala. 36107
[22] Filed: Feb. 14, 1972
[21] Appl. No.: 225,966

[52] U.S. Cl............................................... 56/328 R
[51] Int. Cl........................................... A01g 19/00
[58] Field of Search.................... 56/328 R; 214/356

[56] References Cited
UNITED STATES PATENTS
| | | | |
|---|---|---|---|
| 2,658,637 | 11/1953 | Bailey | 56/328 R |
| 2,656,061 | 10/1953 | Lockie | 56/328 R |
| 3,175,714 | 3/1965 | Witter | 214/356 |

*Primary Examiner*—Hugh R. Chamblee
*Assistant Examiner*—J. A. Oliff
*Attorney*—William T. Hough et al.

[57] ABSTRACT

A nut harvesting machine having about equally spaced flexible wheels laterally aligned, with nut aligning tines extending from the frame anterior to the aligned wheels with narrow tines laterally aligned in front of each of paired end wheels on each end of the aligned plurality of wheels and with in-between narrow tines being in front of every third wheel with an enlarged tine being arranged in front of and between intermediate paired tines such that in most instances the majority of nuts collected between any two adjacent lateral faces of the wheels are flexible of the wheels outwardly from one another by virtue of at least fewer nuts being collected on the opposite sides of the paired adjacent wheels, and with a collection receptacle being adjacent a posterior side of the aligned wheels and being supported on a framework attached to an axle supporting the aligned wheels, with staggered ejection tines extending downwardly between adjacent wheels in the proximity of the collection receptacle such that nuts of any two adjacent collection sites between the two consecutive adjacent paired faces of wheels are not concurrently ejected whereby lateral flexing thereby facilitating ejection is possible at substantially all times and points during the ejection movement of the spaced wheels, the respective spaced wheels each including an outer enlarged rim and spaced inwardly therefrom an inner annular enlarged ring joined by a radially extending lateral wall thereby defining a trap space between the outer and inner enlarged areas, and the trap space being divided by radially extending ridges into segmented compartments around the periphery of the lateral face of each wheel.

9 Claims, 4 Drawing Figures

PATENTED JUL 10 1973

3,744,225

NUT HARVESTING MACHINE

This invention relates to an improved nut harvesting machine for picking up nuts off the ground and placing the picked up nuts into a receptacle.

BACKGROUND OF THE INVENTION

Prior to this invention there existed the inventor's prior patented nut harvester, patented in U.S. Pat. No. 3,613,341. In that patented nut harvester, there was required a conveyor belt mechanism, a structure of reasonable complexity, and there existed various problems such as for example when nuts were lying thickly along a ground surface, merely a few of the nuts could be picked up at any one time between the adjacent wheels, and also the nuts were not always easily ejected because of the lack of flexibility of the walls due to both inherent lack of flexibility of the wheels as well as the presence of large numbers of nuts on either side of each wheel face thereby preventing the wheel from flexing in either direction laterally with the result that the ejecting tines mutilated or destroyed large numbers of jammed nuts. Also, in a collection space between inner and outer enlarged areas of the lateral face of the respective spaced aligned wheels, smaller nuts often would not be trapped at all as well as those trapped which were of a size smaller than the distance between the trapping walls of the enlarged trap space permitting the nuts to fall loosely along the perimeter of the wheel trap space by virtue of the pull of gravity and solely as a result of large numbers eventually filling these spaces with these falling smaller nuts ever reach the elevated position of the ejection tines; in such an instance where large numbers had through collection and jamming eventually reached the ejection tines, there was thereafter the increased possibility of mutilation of these nuts during the ejection of large numbers of nuts.

SUMMARY OF THE INVENTION

An object of this invention is to obtain a nut harvester overcoming one or more problems of the type discussed above.

Another object of this invention is to obtain a nut harvester of simple structure.

Another object of the invention is to obtain a nut harvester easily handled and easily operable either with or without a driving motor.

Another object is a nut harvester having increased capacity with regard to the total number of aligned spaced wheels and/or with regard to each trap space between adjacent faces of paired wheels.

Another object is enhanced collection of nuts of all sizes and varieties.

Another object is to obtain a nut harvester more completely trapping nuts such that they may be easily conveyed to the ejecting tine for each of paired opposing wheel faces.

Another object is a nut harvester allowing for improved wheel flexibility while collecting nuts and/or during the ejection of nuts.

Other objects become apparent from the preceding and following disclosure.

One or more of the preceding objects are obtained by the nut harvesting machine as defined hereafter.

This invention incorporates several coordinated improvements which function unitarily to result in improved harvesting of nuts as compared to the inventor's prior nut harvester.

In particular, substantially all, preferably all of the spaced aligned wheels are equally spaced whereby nuts may be collected between opposing faces of each of the consecutive wheels but concurrently with the nut-aligning tines being of alternate small and large sizes for the intermediate aligned wheels and being positioned relative to the aligned wheels in front of the wheels such that the larger nut aligning tines serve to permit only a few nuts to be collected between adjacent opposite wheel faces following each of the enlarged tines as a result of each enlarged tine being spaced in front of and about between consecutive wheels while each of the smaller tines is spaced directly in front of a particular wheel thereby aligning the nuts with the spaces on either side of that particular wheel for major nut collection in both spaces. As a result of this particular arrangement, also including tines 14a ahead and sidewardly staggered from the last two wheels on each end of the row of aligned spaced wheels, there is increased the probability that always during the ejection of the nuts as well as during the collection of the nuts a particular wheel circumferential area is flexible outwardly because of the lack of any jamming nuts on the other side of the face of that wheel, whereby the outwardly flexible trapping wheels are better able to grasp one or more nuts in variable positions as well as being better able to flex, thereby permitting easy ejection by ejection tines extending downwardly between the opposing faces to eject the nuts outwardly forward and into a receiving receptacle. Additionally, each of the opposing faces of the aligned spaced wheels includes an inner annular enlarged ring and spaced radially outwardly therefrom a second annular enlarged ring thereby forming a trap space between the inner and outer annular rings connected to one another by a radially extending wall to form a trap compartment which is subdivided into a plurality of circumferential separate compartments by a series of radially extending walls dividing the annular trap space into a series of trapping compartments whereby as the wheels are rotated, smaller nuts or loosely collected nuts within the trap space are conveyed by virtue of the radially extending wall upwardly toward the ejecting tines. In a preferred embodiment the several spaced laterally aligned wheels are all commonly fixedly mounted onto a common axle axis whereby all wheels rotate at a common rate of rotation as well as the fact that preferably suitable drive means such as a chain drive is connected to a rotor preferably for propelling the wheels by virtue of propelling the axle to which the wheels are attached.

THE FIGURES

DETAILED DESCRIPTION OF THE INVENTION

Figure 1:
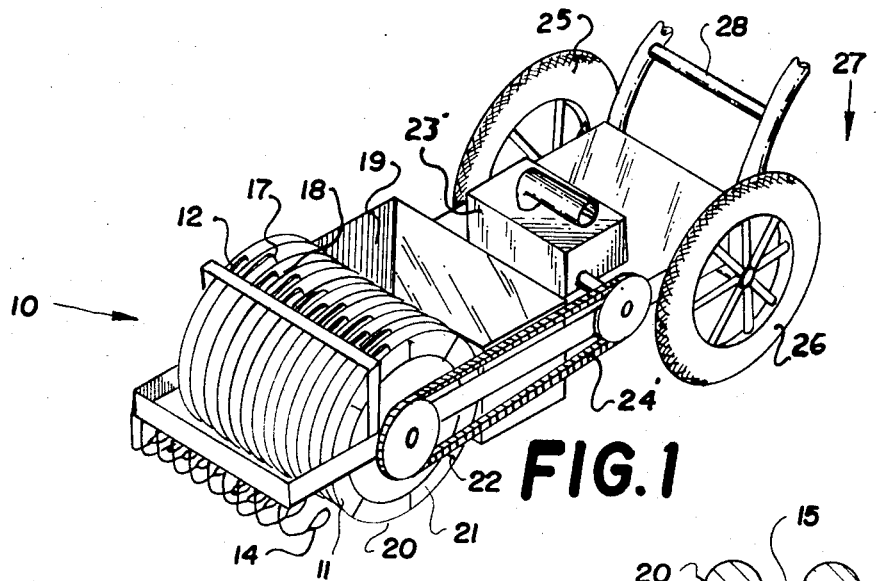
FIG. 1 illustrates a perspective side view of a preferred nut harvester of this invention.
Figure 2:
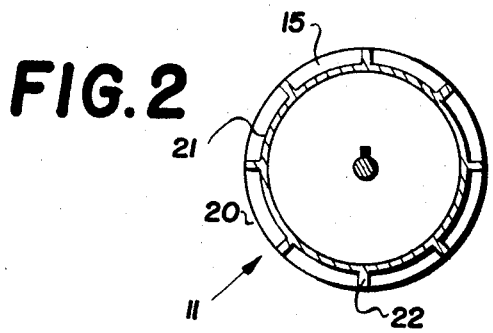
FIG. 2 illustrates a side view of a typical nut-harvesting wheel of the invention.
Figure 3:
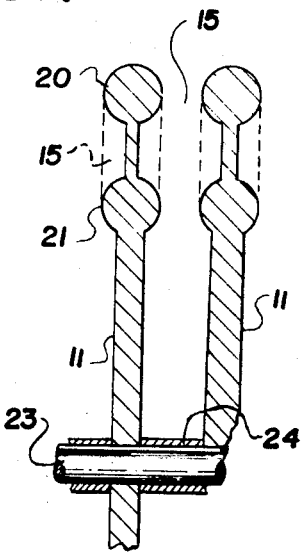
FIG. 3 illustrates an in-part view of a typical cross-section of a pair of nut-harvesting adjacent laterally-spaced and aligned wheels of this invention.
Figure 4:
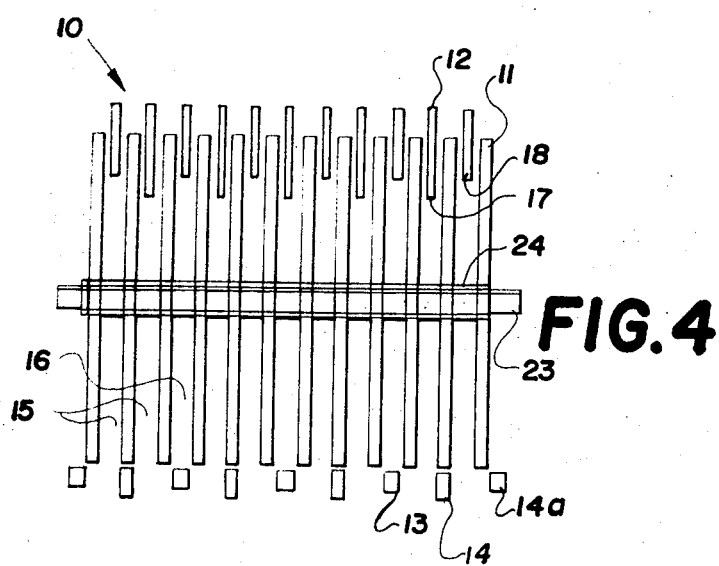
FIG. 4 illustrates diagrammatically the structural relationships and alignment and non-alignments and staggered relationships of various tines relative to the equally spaced aligned nut-collecting wheels of the inveniton.

FIG. 1 in greater detail discloses a nut harvesting unit 10 which in this particular embodiment is motor driven by motor 23' by way of chain 24'. The motor driven nut pick-up may be geared to rotate the wheels 11 outer-perimeter surface faster than the outer-perimeter surface motion of the driving wheels 25 and 26, with the major weight of the apparatus being preferably supported by rear wheels 25 and 26. The advantage of faster rotation of unit 10 is the gathering of nuts more efficiently when nuts are extremely dense on the ground surface. All wheels 11 are used to form nut harvesting units 10 and preferably are equally spaced on the axle 23 by spacer sleeves 24 (shown in FIG. 4). Kick out fingers (tines) may be placed between every wheel 11 (also shown in FIG. 4). The purpose of the equi-distant spacing of the wheels 11 is to reduce the amount of debris picked up by the unit 10 as well as to reduce the possibility of the unit clogging on the collected nuts, for reasons previously stated. When all the wheels 11 are equally spaced, the alternate drag finger tines 13 shown in FIG. 4, with the exception of the drag finger tines 14 and 14a alternately occurring and on each end of the nut harvesting unit 10 are preferably thicker in width than the others in order that the alternate wider drag finger-tines 13 guide the nuts into position for pickup by traps 15 and away from buffer zone 16 thereby allowing for expansion of the wheels 11 at the receiving and ejection points 17 and 18 as illustrated in each of FIGS. 1 and 4. The kick-out tine-fingers 12, also illustrated in FIGS. 1 and 4, may be so positioned as to slightly vary the ejection points 17 and 18 — i.e., may be staggered alternately between the alternately consecutively occurring wheels, along the circumference of the wheels and extending downwardly between the wheels in order to function as ejection tines. The ejection tines are preferably located in juxtaposition to and about directly above the collection receptacle 19. The varied ejection points such as staggered tine fingers reduce the force needed to eject the nuts. In the mounting of the nut harvester apparatus on a tractor or other motor vehicle, the harvester preferably would be mounted on the front of the vehicle to prevent the tires from damaging the nuts on the ground surface. The wheels of the present invention preferably include improvements whereby the wheels may be made solid —no spokes or divisions, and each solid wheel 11, as shown in each of FIGS. 2 and 3, has projecting ridges 20 along their circumference and a smaller ridge 21, each of these shown in FIGS. 2 and 3, forming a concentric circle positioned slightly less than the diameter of a nut from the outer ridge 20. At intervals around the wheel 11 and extending from ridge 20 to ridge 21 are several ridges 22, as shown in FIG. 2. Ridge 20, ridge 21, and ridge 22 form a trap 15 as shown in FIGS. 2 and 3, the purpose of this trap being to pick up nuts and carry them upwardly to the ejection points 17 and 18. Preferably wheels are made with both sides of each wheel being identical for practical operation as well as reduced cost in making all wheels the same in the manufacture of the machine.

It is to be understood that modifications and variations may be made to the disclosed nut-harvesting machine of this invention in the nature of those made a part of the former patent, provided that such modifications are not contrary to the spirit of this invention. Similarly, it is within the scope of the invention to make substitutions of equivalent elements and modifications and variations as would be apparent to a person skilled in this art.

I claim:

1. A nut harvesting machine comprising in combination: carriage means for advancing along a ground surface from which nuts are to be gathered; a receptacle element receivable of nuts picked up from the ground surface; a framework carried by the carriage means and at least one nut gathering unit in juxtaposition to said receptacle element, said nut gathering unit comprising a plurality of laterally substantially equally spaced axially aligned wheels rotatably carried by the framework and movable along the ground; a first plurality of laterally substantially equally spaced tines carried by said framework forwardly of the wheels and arranged to align nuts on the ground with predetermined spaces between the wheels such that nuts are engaged between the wheels as the tines pass the nuts on the ground, said first plurality of tines comprising first and second arrays of tines, said first array of tines comprising a plurality of forwardly-elongated tines, each of said forwardly-elongated tines being positioned in longitudinal alignment with a respective every third consecutive one of said wheels, said second array of tines comprising a plurality of at least laterally enlarged tines, the tines of said first array being alternately spaced with the tines of said second array; a second plurality of substantially equally laterally spaced tines staggered forwardly and rearwardly of one another with at least one tine thereof extending downwardly between a pair of adjacent wheels, the second plurality of tines being carried by said framework and being arranged to eject nuts engaged between the wheels as the wheels rotate past said second plurality of tines such that ejected nuts become collected in said receptacle element.

2. A nut harvesting machine according to claim 1 in which each wheel in diametrical cross-section includes an enlarged outer ring and an enlarged inner ring connected by a narrow radially extending wall such that a trap space is formed between the inner and outer enlarged rings, each wheel further including axially extending spaced ridges dividing said trap space into a plurality of circumferential compartments.

3. A nut harvesting machine of claim 2, in which said narrow radially extending wall is at least slightly flexible.

4. A nut harvesting machine of claim 1, in which at least radially outward portions of each of said spaced wheels are at least slightly flexible, and each of said plurality of tines is flexible both laterally and upwardly relative to a horizontal ground surface.

5. A nut harvesting machine of claim 4, in which each of said laterally spaced wheels are fixedly attached to a common axle element whereby all wheels and the axle revolve at an identical rate.

6. A nut harvesting machine of claim 5, including a drive means mounted on said framework for driving said axle and wheels at a predetermined rate of revolutions.

7. A nut harvesting machine of claim 6, in which each wheel in diametrical cross-section includes an enlarged outer ring and an enlarged inner ring connected by a narrow radially extending wall such that a trap space is formed between the inner and outer enlarged rings, each wheel further including axially extending spaced ridges dividing said trap space into a plurality of circumferential compartments.

8. A nut harvesting machine of claim 7, including at least two spaced-apart rearwardly-spaced wheels mounted on said framework and supportable on posterior portions of said framework, said drive means being drivably connected to said rearwardly-spaced wheels.

9. A nut harvesting machine of claim 1, including at least one rearwardly spaced wheel supportedly mounted on a posterior portion of said framework.

* * * * *